United States Patent [19]

Matsunaga et al.

[11] Patent Number: 4,917,806

[45] Date of Patent: Apr. 17, 1990

[54] METHOD OF AND APPARATUS FOR CONTROLLING PH AND ELECTRICAL CONDUCTIVITY OF WATER USING ION EXCHANGE RESIN

[75] Inventors: Yoshihiro Matsunaga; Tadao Nishimori; Hiromasa Matsuoka, all of Amagasaki, Japan

[73] Assignee: Mitsubishi Denki Kabushiki Kaisha, Japan

[21] Appl. No.: 286,715

[22] Filed: Dec. 20, 1988

[30] Foreign Application Priority Data

Dec. 21, 1987 [JP] Japan .................. 62-321341

[51] Int. Cl.$^4$ .................................................. C02F 1/42
[52] U.S. Cl. .................................. 210/662; 210/686; 210/790; 210/96.1; 210/194; 210/284; 210/290
[58] Field of Search ............... 210/662, 686, 743, 746, 210/790, 96.1, 103, 253, 284, 290, 167, 900, 194, 196

[56] References Cited

U.S. PATENT DOCUMENTS

| | | | |
|---|---|---|---|
| 2,287,284 | 6/1942 | Behrman | 210/16 |
| 2,938,868 | 5/1960 | Carlson et al. | 210/662 |
| 3,985,648 | 10/1976 | Casolo | 210/686 |
| 4,622,133 | 11/1986 | Furuno | 210/900 |

FOREIGN PATENT DOCUMENTS 735894 8/1955 United Kingdom .
2128176 4/1984 United Kingdom .

OTHER PUBLICATIONS

"pH Control by Ion Exchange in High-pH Systems", Demmitt, Chemical Abstracts, vol. 57, No. 7, 1962.
"Boshoku Gijutsu Binran", Association of Corrosion Prevention, 1986, pp. 643-644.

*Primary Examiner*—Ivars Cintins
*Attorney, Agent, or Firm*—Leydig, Voit & Mayer

[57] ABSTRACT

Water is allowed to flow in parallel into a mixed bed in which an anion exchange resin and a cation exchange resin are disposed in a mixed state and into a single bed in which an anion exchange resin or a cation exchange resin is disposed. As the proportion of the flow rates of water introduced into the two beds is adjusted, the pH and electrical conductivity of water is controlled. Control is effected in such a manner that the pH and electrical conductivity of water are maintained at appropriate levels without using any chemicals.

7 Claims, 6 Drawing Sheets

METHOD OF AND APPARATUS FOR CONTROLLING PH AND ELECTRICAL CONDUCTIVITY OF WATER USING ION EXCHANGE RESIN

BACKGROUND OF THE INVENTION

1. Field of the Invention

The present invention relates to a method of and an apparatus for controlling the pH and electric conductivity of water, and more particularly to a method of and an apparatus for controlling the pH and electric conductivity of water which are suitably used for suppressing corrosion of metals of such as a heat exchanger and piping of a cooling and heating system in which high-purity water is used as a heat transfer medium.

2. Description of the Related Art

Corrosion in high-purity water is influenced by the flow rate of water and dissolved oxygen, and is also affected by the pH of water. FIG. 1 shows the relationship between the pH and solubility of various copper ions at 25° C. From this drawing, it can be seen that the corrosion of copper can be suppressed by using water of pH 9.

The pH control is generally performed by adding such chemicals as cyclohexylamine, morpholine, ammonia and caustic soda in addition to hydroquinone which is generally used in boiler water. This described in, for example, "*Boshoku Gijutsu Binran*" (Handbook of Corrosion Technology) complied by the Association of Corrosion Prevention (1986), pp. 643-644.

However, there have been drawbacks in that such chemicals, if added in excess, can accelerate corrosion. The electrical conductivity of water increases as the chemicals are added for replenishment to maintain the pH to an appropriate level, thereby promoting corrosion. Moreover, the electric conductivity of the water cannot be controlled by adding chemicals.

SUMMARY OF THE INVENTION

Accordingly, an object of the present invention is to provide a method of and an apparatus for controlling the water quality to appropriate levels of pH and electric conductivity without adding chemicals to water, thereby overcoming the above-described drawbacks entailed by the addition of chemicals.

To this end, according to one aspect of the invention there is provided a method of controlling the pH and electrical conductivity of water by means of an ion exchange resin, the method comprises the steps of: allowing water to flow in parallel into a mixed bed in which an anion exchange resin and a cation exchange resin are accommodated in a mixed state and a single bed in which an anion exchange resin of a cation exchange resin is accommodated; and adjusting a proportion of low rates of water flowing into the both beds, thereby controlling the pH and electrical conductivity of the resultant water.

According to another aspect of the invention there is provided an apparatus for controlling the pH and electrical conductivity of water by means of an ion exchange resin, the apparatus comprises: a mixed bed in which an anion exchange resin and a cation exchange resin are accommodated in a mixed state; first flow-rate adjusting means for adjusting the flow rate of water supplied to the mixed bed; a single bed in which anion exchange resin or a cation exchange resin is accommodated; second flow-rate adjusting means for adjusting the flow rate of water supplied to the single bed; electrical conductivity measuring means for measuring the electrical conductivity of water flowing out from the mixed bed or the single bed; and pH measuring means for measuring the pH of the water, wherein a proportion of the flow rates of water flowing in parallel into the both beds is adjusted by the first and second flow-rate adjusting means to control the pH and electrical conductivity of the resultant water.

The above and another objects, features and advantages of the invention will become more apparent from the following detailed description of the invention when read in conjunction with the accompanying drawings.

DESCRIPTION OF THE PREFERRED EMBODIMENTS

First, a description will be given of a basic principle of a method of controlling the pH and electrical conductivity using an ion exchange resin in accordance with the present invention. When an anion exchange resin is used in a single bed, alkali water is obtained through the reaction of Formula (1) given below, while, when a cation exchange resin is used in a single bed, acidic water is produced through the reaction of Formula (2) given below.

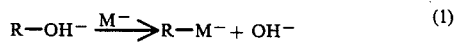

$$R-OH^- \xrightarrow{M^-} R-M^- + OH^- \qquad (1)$$

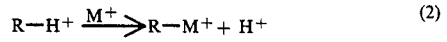

$$R-H^+ \xrightarrow{M^+} R-M^+ + H^+ \qquad (2)$$

An anion exchange resin and a cation exchange resin are accommodated in a mixed bed in a mixed state and serve to refine water passing through the mixed bed, i.e., lower the electrical conductivity of water. For instance, in order to control water to obtain alkali water quality, a mixed bed having an anion exchange resin and a cation exchange resin accommodated therein and a single bed having an anion exchange resin accommodated therein are arranged in parallel in the flow channel of a cooling and heating system. As the ratio between the flow rate of water flowing through the mixed bed and that of water flowing through the single bed is controlled, the pH can be controlled to the alkali side. The pH increases if, for instance, the flow rate of water supplied to the single bed is increased and the flow rate of water supplied to the mixed bed is fixed.

Similarly, if a cation exchange resin is used by being accommodated in the single bed, the pH control of water on the acidic side is possible.

Figure 1:
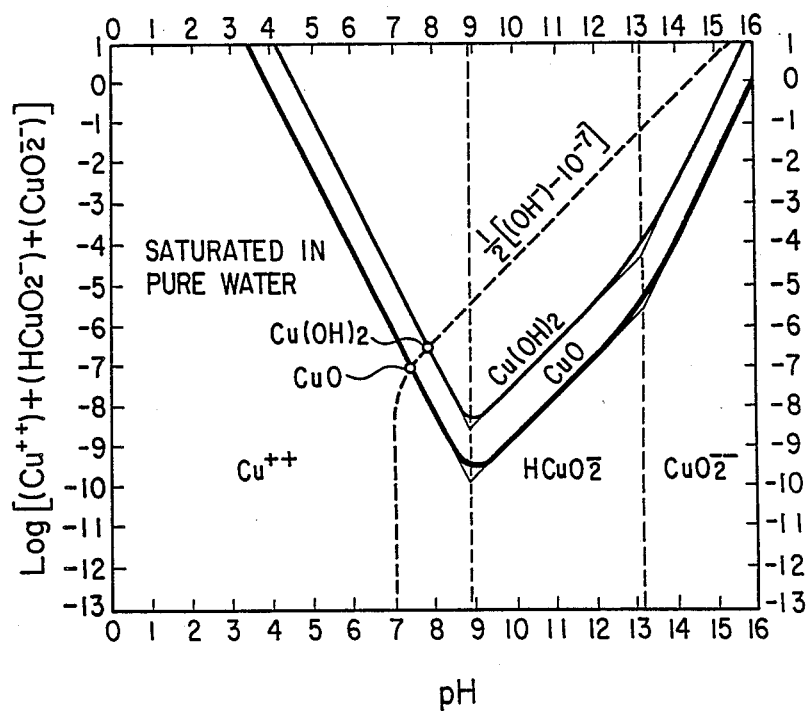
FIG. 1 is a diagram illustrating that corrosion of copper is affected by pH.
Figure 2:
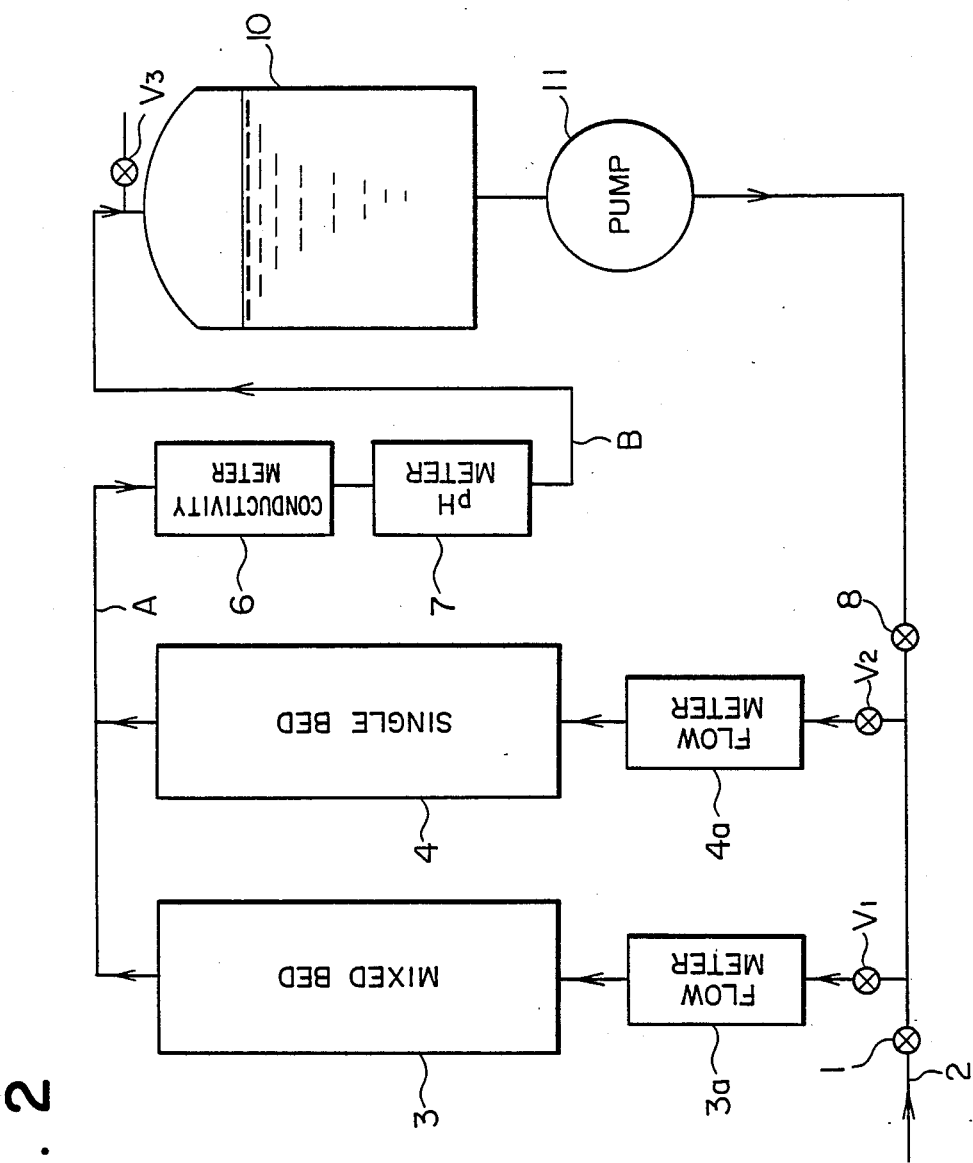
FIG. 2 is a schematic diagram illustrating an apparatus for implementing a method of controlling pH in accordance with an embodiment of the present invention.

FIG. 2 is a schematic diagram illustrating an apparatus for implementing a method of controlling the pH and electrical conductivity in accordance with an embodiment of the present invention. In the drawing, water, e.g. tap water, is supplied from a supply passage 2, which is opened and closed by a valve 1. The supply passage 2 is provided with a mixed bed 3 accessible via a valve $V_1$ and a flow meter 3a. An anion exchange resin and a cation exchange resin (neither are shown) are accommodated in the mixed state in this mixed bed 3 at a proportion of 1:2 in terms of the volume ratio. A single bed 4 accommodating a cation exchange resin or an anion exchange resin accessible via a valve $V_2$ and a flow meter 4a are provided in parallel with the mixed bed 3. In this embodiment, an anion exchange resin (not shown) is accommodated in the single bed 4. Water flowing out from the mixed bed 3 and the single bed 4 is introduced into a tank 10 for storing water via a conductivity meter 6 and a pH meter 7 for measuring the electrical conductivity and pH of water, respectively. A switching valve $V_3$ for sampling water is provided in the vicinity of a water inlet of the tank 10. In addition, a pump 11 for circulating water to the mixed bed 3 and the single bed 4 is provided at an outlet of the tank 10.

Figure 3:
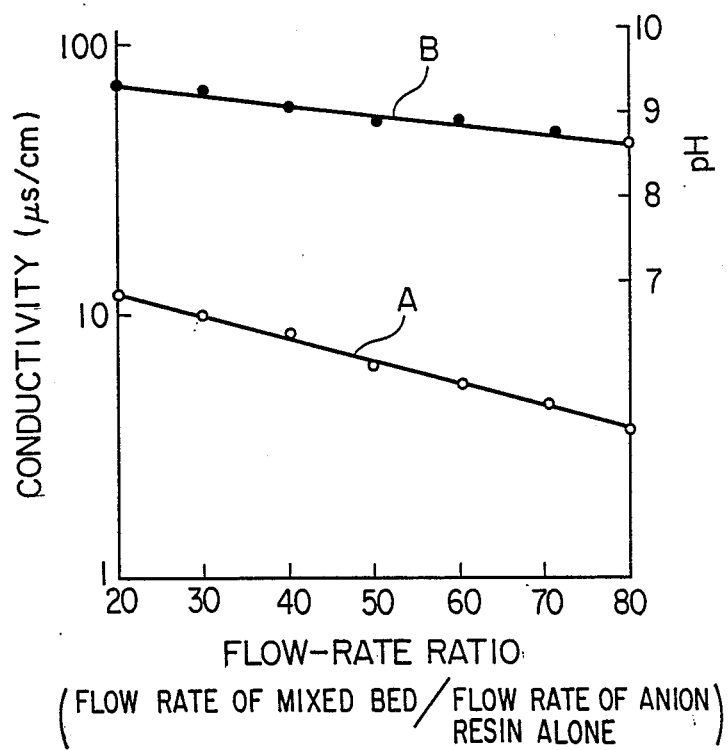
FIG. 3 is a characteristic diagram illustrating the relationship among a flow-rate ratio, pH, and electrical conductivity measured by the apparatus shown in FIG. 2.
Figure 4:
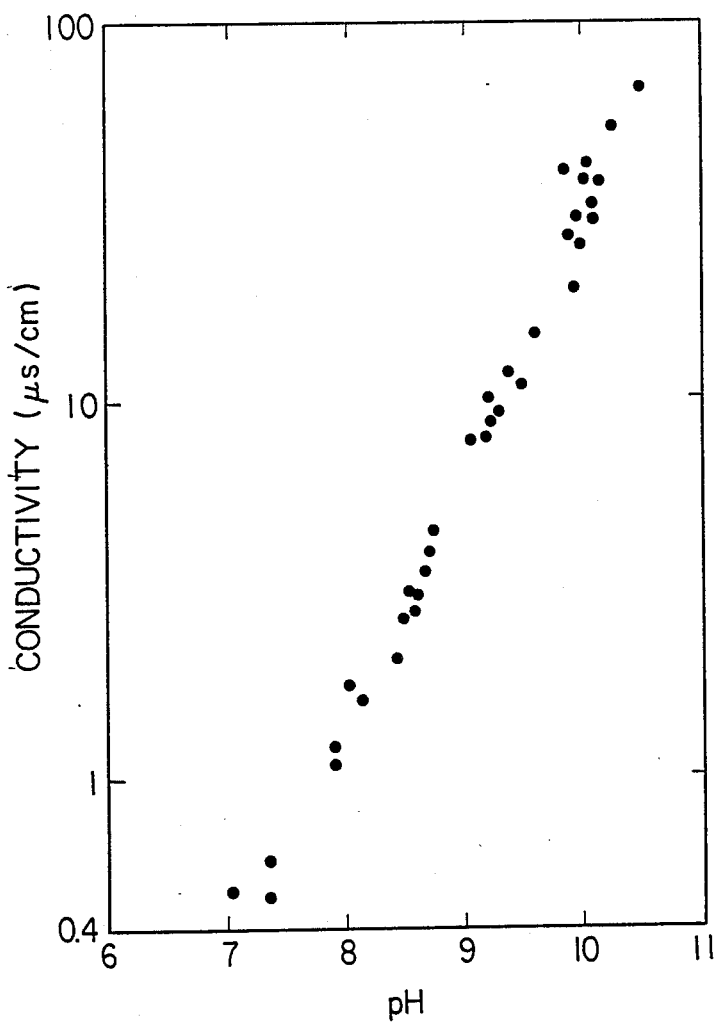
FIG. 4 is a characteristic diagram illustrating the relationship between pH and electrical conductivity measured by the apparatus shown in FIG. 2.

In this apparatus, with the valve 8 closed and the valve 1 open, tap water was introduced into the mixed bed 3 and the single bed 4 from the flow meters 3a, 4a to be subjected to ion exchange. The electric conductivity and pH of the obtained water were respectively measured by the conductivity meter 6 and the pH meter 7. FIG. 3 illustrates an example of the results of such measurement, in which the flow rate for the mixed bed 3 was set to 2 l/min and the flow rate of water supplied to the single bed 4 accommodating anion exchange resin was varied to determined the effect thereof. In FIG. 3, curves A, B respectively denote the electrical conductivity and the pH of the water. In addition, measured values of the electric conductivity and the pH are plotted in FIG. 4. As is apparent from FIGS. 3 and 4, if the flow rate of tap water supplied to the anion exchange resin is controlled to an appropriate level with the flow rate for the mixed bed 4 fixed, it is possible to produce water having fixed levels of pH and electrical conductivity. This water may be used for a device such as a heat exchanger subject to corrosion prevention.

Figure 5:
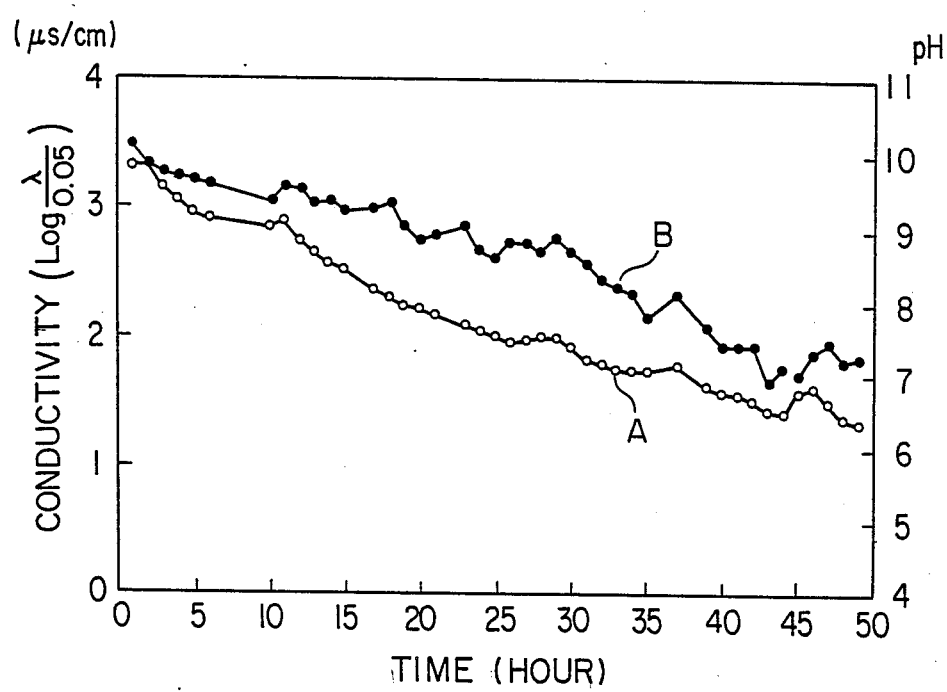
FIG. 5 is a characteristic diagram illustrating the change with time of pH and electrical conductivity measured in a case where water was circulated in the apparatus shown in FIG. 2.

FIG. 5 shows the results of measurement of the pH and electrical conductivity over time in a case where supply water is circulated to the mixed bed 3 and the single bed 4 by means of the pump 11 after water of pH 9.8 was supplied to the tank 10 and the valve 8 was opened. In FIG. 5, curves A and B respectively denote the electrical conductivity and the pH. It is evident from FIG. 5 that the electric conductivity of circulating water declines with an elapse of time, and the pH also declines correspondingly. This is attributable to the fact that the impurities contained in water decrease as water is circulated and passes through the mixed bed 3 or the single bed 4 accommodating the anion exchange resin, with the result that the amount of $OH^-$ ions produced from the anion exchange resin in the single bed 4 decreases in accordance with the aforementioned Formula (1). Accordingly, in order to control the pH and electrical conductivity of water to a predetermined value in this circulating system, it suffices, for instance, to open the valve 1 shown in FIG. 2 and mix an appropriate amount of freshly supplied tap water.

In order to employ the method of the above-described embodiment for circulating water for a device subject to corrosion prevention such as a cooling and heating system, it suffices to insert the device subject to corrosion prevention at, for instance, a position A or B in FIG. 2. In this case, it is possible to automate the operation by controlling the valves $V_1$, $V_2$ valves 1, 8 or the pump 11 in response to output signals of the flow meters 3a, 4a or the conductivity meter 6 and the pH meter 7. Alternatively, the maintenance of the ion exchange resins used can be facilitated by providing a plurality of the mixed beds 3 and the single beds 4, by providing a changeover valve, and changing over the beds 3, 4 and using them alternately.

In addition, it is evident that the water quality can be controlled in such a manner as to allow the pH on the acidic side to be exhibited at a fixed conductivity by using a cation exchange resin as the ion exchange resin accommodated in the single bed 4 shown in FIG. 2.

Figure 6:
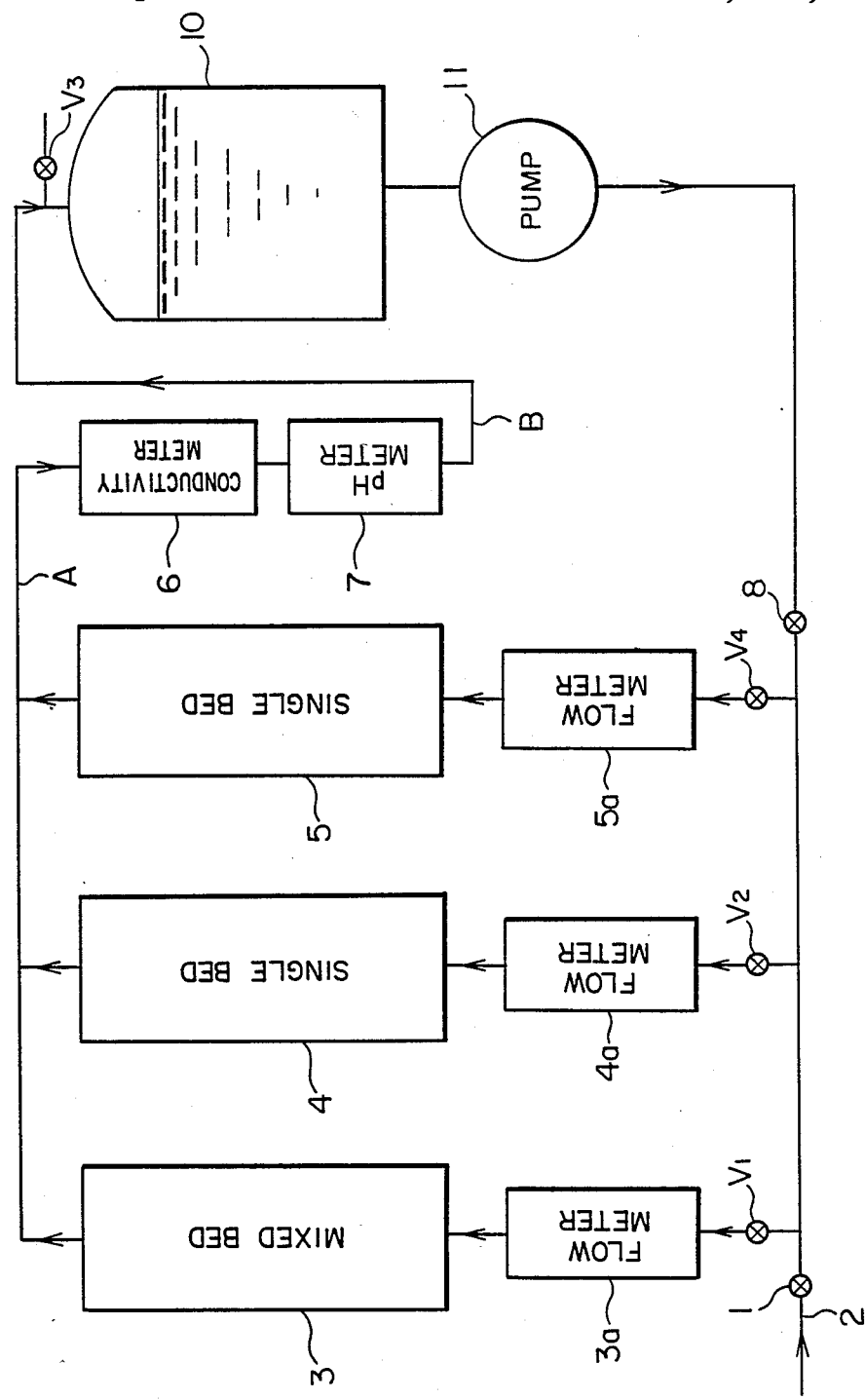
FIG. 6 is a schematic diagram illustrating an apparatus for implementing a method of the pH control in accordance with another embodiment of the present invention.

Furthermore, the pH control can be effected in a wide range of pH, ranging from the acidic side to the alkali side, if, as shown in FIG. 6, two single beds 4, 5 are juxtaposed in parallel, one is filled with an anion exchange resin and the other with a cation exchange resin, and these two single beds 4, 5 are used by being changed over by the valve $V_2$ and a valve $V_4$.

It goes without saying that the arrangements, configurations, etc. of the mixed bed and single beds are not particularly restricted. In short, various modifications are possible insofar as the condition is such that water and the ion exchange resin are capable of being brought into contact with each other.

Although in the above-described embodiment the mixing ratio between the anion exchange resin and the cation exchange resin in the mixed bed is set to 1:2 in terms of the volume ratio, it is possible to use a desired mixing ratio in the light of the type of an ion exchange resin used, supply water, a set electrical conductivity, etc.

In addition, although in the above-described embodiment a description has been given of a case where the present invention is used for the prevention of corrosion of a metal employed in a cooling and heating system, the present invention is not restricted to the same. In addition, the metal is not restricted to copper, either. Moreover, it is not essential to form a circulating passage.

What is claimed is:

1. A method of controlling the pH and electrical conductivity of water by means of ion exchange resins comprising:

dividing a flow of inlet water into first and second streams, respectively;

directing the first stream to flow into a mixed bed containing a mixture of an anion exchange resin and a cation exchange resin;

directing the second stream into a single bed containing one of an anion exchange resin and a cation exchange resin;

combining the first and second streams after their respective flows through the mixed and single beds into a flow of outlet water;

supplying some of the outlet water as at least part of the inlet water; and adjusting the proportion of the flow of the inlet water between the first and second streams to control the pH and electrical conductivity of the outlet water.

2. A method according to claim 1 including supplying fresh water and outlet water as the inlet water to the mixed bed and single bed to maintain the pH of the outlet water at a predetermined value.

3. A method according to claim 1 including first and second single beds wherein an anion exchange resin and a cation exchange resin are disposed in the first and second single beds, respectively.

4. A method according to claim 1 including a plurality of mixed beds and a plurality of single beds including using the plurality of mixed beds alternately and using the plurality of single beds alternately.

5. An apparatus for controlling the pH and electrical conductivity of water with ion exchange resins comprising:

a mixed bed in which a mixture of an ion exchange resin and a cation exchange resin are disposed, connected for receiving a first portion of a flow of inlet water and for discharging the first portion after its passage through said mixed bed;

a single bed in which one of an anion exchange resin and a cation exchange resin is disposed, connected for receiving a second portion of the flow of inlet water and for discharging the second portion after its passage through said single bed;

means for adjusting the proportion of the inlet water flow in the first and second portions, the first and second portions together containing all of the flow of inlet water;

means for combining the first portion after its passage through said mixed bed with the second portion after its passage through said single bed into a flow of outlet water;

electrical conductivity measuring means for measuring the electrical conductivity of the outlet water;

means for supplying some of the outlet water to said means for adjusting as at least part of the inlet water; and pH measuring means for measuring the pH of the outlet water, wherein the proportion of the first and second portions may be adjusted by said means for adjusting to control the pH and electrical conductivity of the outlet water.

6. The apparatus of claim 5 wherein said means for adjusting comprises a means for controlling the flow rate of the inlet water and means for controlling the flow rate of the first portion.

7. The apparatus of claim 5 wherein said means for adjusting comprises a means for controlling the flow rate of the inlet water and means for controlling the flow rate of the second portion.

* * * * *